United States Patent Office 3,415,660
Patented Dec. 10, 1968

3,415,660
CLEAR COOKING AND SALAD OILS HAVING ANTISPATTERING PROPERTIES
Edward R. Purves, Forest Park, Louis H. Going, Deerfield Township, Warren County, and Robert D. Dobson, Greenhills, Ohio, assignors to The Procter & Gamble Company, Cincinnati, Ohio, a corporation of Ohio
No Drawing. Filed Dec. 29, 1965, Ser. No. 517,419
6 Claims. (Cl. 99—163)

ABSTRACT OF THE DISCLOSURE

Clear cooking and salad oils having anti-spattering properties by adding about 0.1% to about 1.0% by weight of an acid treated unsaturated fatty acid ester of polyoxyethylene sorbitan containing an average of about 20 oxyethylene units per molecule, said fatty acid having from about 14 to about 18 carbon atoms.

---

This invention relates to an improved cooking and salad oil composition having antispattering properties; the oil remains clear and free from a precipitate under normal storage and usage conditions. More particularly, this invention relates to a clear antispattering cooking and salad oil containing small amounts of monoesters of polyoxyethylene sorbitan and long chain unsaturated fatty acids.

Liquid vegetable oils such as cottonseed oils, soybean oil, corn oil and olive oil are generally used as cooking and salad oils. In preparing green salads a liquid cooking or salad oil is used to provide an oil coating on the basic ingredients of the salad. A solid fat or plastic shortening is not well suited for this purpose. Liquid oils are also preferred over solid fats and plastic shortenings for many cooking tasks; for example, the frying of potatotes, fish, eggs, and meat products such as cube steaks, minute steaks, and the like. In the deep frying of food products such as doughnuts, potatoes, and potato chips, liquid oils are frequently used. Liquid oils are also used in the preparation of salad dressings and mayonnaise where the consistency and stability of the final product is often adversely affected by solid or plastic fats or shortenings.

Many foods which are prepared by frying in liquid oil have a high moisture content. In pan frying these foods (especially during the early stages of frying), the contact between the relatively cool water in the food and the hot liquid oil in the cooking pan vaporizes the water into steam which in turn causes the hot oil to spatter. It is a common experience to have hot oil spatter from a frying pan when minute steaks, particularly frozen steaks, are placed in a frying pan containing hot oil. The spattered oil is messy; in addition, it can cause minor burns unless care is exercised during the frying operation.

A number of different substances have been suggested as antispattering agents to either inhibit or retard spatter during the frying of foods. Some of these substances are particularly useful in products which are oil-in-water emulsions, such as margarine, wherein they tend to reduce the oil spatter caused by the sudden breakdown of the emulsion when the emulsion is heated. The application of heat causes the oil-in-water emulsion to release large droplets of water. The sudden escape of steam from these droplets expels hot fat particles with sufficient explosive force to cause the fat to spatter. This phenomenon can be observed when margarine is heated in a pan before the addition of any food to the pan. The sodium sulfoacetate derivatives of mono- and diglycerides and other substances such as, for example, those described in U.S. Patents 1,917,249 through 1,917,260, inclusive, are typical margarine antispattering agents. Other antispattering agents for margarine and margarine type emulsion products are described in U.S. Patents 3,006,772 and 3,015,566.

The present invention is concerned with spattering caused by the moisture contained in food products rather than the water contained in emulsions. Spattering caused by contact between cold, moist food and hot frying fat presents a problem the solution to which is unrelated to the solution of the problem of spattering caused by the sudden breakddown of an emulsion and the accompanying release of water. The ordinary emulsifying agents which are useful in margarine and in various cooking and baking shortenings do not possess the antispattering properties desired for cooking and salad oils, particularly, clear oils. Antispattering agents which are useful in all-purpose plastic shortenings, such as the sorbitol esters of long-chain fatty acids described in U.S. Patent 3,138,463, are not well suited for cooking and salad oils where clarity is an important characteristic.

It is a primary object of this invention to provide an improved cooking and salad oil composition having a reduced tendency to spatter during the frying of moist foods.

It is another object of this invention to provide a clear cooking and salad oil composition which has antispattering properties.

It is a further object of this invention to provide an antispattering cooking and salad oil composition which is also useful for the preparation of stable salad dressings and mayonnaise.

Briefly stated, the cooking and salad oil composition of this invention comprises a clear, liquid glyceride base oil containing as an active antispattering agent from about 0.1% to about 1.0%, by weight, and preferably from about 0.125% to about 0.3%, by weight, of the total composition, of unsaturated fatty acid monester of polyoxyethlene sorbitan containing an average of about 20 oxyethylene units per molecule, said fatty acid having from about 14 to 18 carbon atoms.

It is known that certain general classes of materials such as the sorbitan partial esters and the polyoxethylene ethers of sorbitan partial esters, respectively, have useful emulsifying properties for plastic and liquid shortenings. For example, the sorbitan esters are disclosed in U.S. Patents 2,303,432 and 2,322,820–1 and their polyoxyethylene derivatives are disclosed in U.S. Patent 2,380,166. The use of these compounds and other types of materials for emulsifying purposes in opaque liquid shortenings for cake baking is described in U.S. Patents 2,746,868, 2,968,562–4, and 3,117,010. These patents teach broad classes of materials and broad ranges of concentrations for these materials. It was not previously known that the particular esters described above are useful in amounts of from about 0.1% to about 1.0%, by weight, of a clear, liquid glyceride base oil to impart antispattering properties to the oil.

In accordance with the present invention it is essential that the antispattering agent which imparts the antispattering properties to the cooking and salad oils be a monoester as distinguished from di-, tri-, or higher partial or complete ester. It is also essential that the fatty acid portion of the monoester contain from about 14 to about 18 carbon atoms and that it be derived from predominantly unsaturated fatty acids as distinguished from saturated fatty acids. Examples of suitable unsaturated fatty acids for this purpose are myristoleic, palmitoleic, oleic, linoleic and linolenic acids. The saturated monoesters such as polyoxyethylene sorbitan monostearate and the more fully esterified products such as polyoxyethylene sorbitan tristearate destroy the clarity of the liquid base oil of the cooking and salad oil compositions at low storage temperatures.

As previously indicated, it is preferred that the level of the antispattering agent be from about 0.125% to about 0.3%, by weight, of the cooking and salad oil composition. At levels above about 0.3%, by weight, the composition develops what has been described by some taste experts as an "off-flavor." For some persons, this "off-flavor" is not detectable at levels up to about 0.5%, by weight. Therefore, the preferred concentration of the antispattering agent can be extended to about 0.5%, by weight, of the composition.

In order to insure the clarity of the compositions of this invention, it is essential that the liquid glyceride base oil be substantially free of general purpose shortening emulsifiers such as mono- and diglyceride esters, lactylated glyceride esters, and any other materials which might tend to cloud the base oil or otherwise interfere with its clarity. The use of substances which are fluidizers, for example, aluminum tripalmitate, reduce the antispattering characteristics of the cooking and salad oil compositions; their use should also be avoided.

A wide variety of liquid glyceride base oils can be used in the cooking and salad oil compositions of this invention. Included among suitable oils are the so-called natural salad oils such as, for example, olive oil, sunflower seed oil, safflower oil, and sesame seed oil. Other naturally-occurring liquid glyceride oils such as, for example, cottonseed oil and corn oil are also useful; these oils are given a preliminary "winterizing," dewaxing, or similar treatment to remove the higher melting stearins before being used as a base oil. Certain other oils such as, for example, soybean oil, can be partially hydrogenated before use to improve their resistance to oxidative deterioration during prolonged storage periods; the higher melting solids formed during the hydrogenation treatment are preferably removed by winterization.

Suitable clear liquid glyceride base oils also can be obtained by directed, low temperature interesterification or rearrangement of animal or vegetable fatty materials, followed by the removal of the higher melting solids formed during the reaction. For an example of this procedure, see U.S. Patent 2,442,532. Another group of oils suitable for use as the liquid glyceride base oil is that group of oils in which one or more short-chain fatty acids, such as acetic acid and propionic acid, replace, in part, the long-chain fatty acids present in natural triglyceride oils.

Other useful clear liquid glyceride oils can be derived from animal, vegetable and marine sources, including mixtures of various such oils. Particularly preferred oils for use in this invention are cottonseed oil, soybean oil, and mixtures thereof.

According to one aspect of this invention, the polyoxyethylene sorbitan monoester component, prior to its admixture with the clear base oil, is subjected to an acidifying treatment with an acid such as phosphoric acid, sulfuric acid, or hydrochloric acid, or, alternatively, is passed through an acid activated filtering clay such as "Superfiltrol." Although the pure monoester product probably does not exhibit a true pH, since it is essentially free of water, the monoester is preferably treated with acid media so that it ultimately shows a pH of not more than about 7 (preferably between about 6.5 and 7) in the presence of a trace of water when measured by conventional pH indicators, for example, a Beckman pH meter. The term "acid-treated" is used herein to describe the above-described or similar acidifying treatment. "Apparent pH" is used herein to describe the pH of the monoester in the presence of a trace of water either before or after it is "acid treated."

The following examples illustrate the present invention; however, it is understood that the invention is not limited thereto since other variations will be readily discernible to those skilled in the art after reading the description of the invention. All percentages and proportions in the following examples are by weight rather than volume unless otherwise specified.

EXAMPLE 1

Seven cooking and salad oil compositions were prepared from refined, bleached and deodorized soybean oil partially hydrogenated to an iodine value of about 107 and winterized after hydrogenation. Acid-treated "Tween–80" was dispersed in six of the seven compositions in the amounts shown in Table I, below, by thoroughly mixing the "Tween–80" and the oil for three minutes in a Waring Blendor. The oil without the "Tween–80" was used as a control.

"Tween–80" is a commercially available product which is a mixture of polyoxyethylene sorbitan esters of predominantly monounsaturated oleic acid; it contains an average of about twenty oxyethylene units in the molecule [i.e., polyoxyethylene (20) sorbitan monooleate]. The commercial product has an apparent pH in the presence of a trace of water of about 8. The "Tween–80" used in this example was acid treated with phosphoric acid (85% solution) to reduce its apparent pH to about 6.5 in the presence of a trace of water when measured with a Beckman pH meter. The acid treatment was carried out by first heating the "Tween–80" to about 145° F. in a stainless steel bowl to reduce its viscosity before adding the amount of acid calculated to lower the pH of the "Tween–80" to the desired level, and slowly stirring the mixture to insure that the acid became uniformly dispersed.

The seven liquid oil compositions were used in frying frozen minute steaks. In each instance, the oil and other material which spattered from the frying pan during frying were collected and weighed in order to determine the amount of spatter reduction achieved with the "Tween–80" additive compared to the control which contained no "Tween–80." Frying was done in ten-inch square "Sunbeam" Electric Frypans at 360° F. and 420° F. The lower temperature is the customary frying temperature for frozen steaks. Frying was also conducted at the higher temperature in order to demonstrate the improved spatter reduction under very vigorous frying conditions. In carrying out each frying sequence, a frozen minute steak (75 grams) was placed in the center of a frying pan in which the oil (30 grams) had been heated to the test temperature. The steak was fried for two and one-half minutes on each side. The oil and other material which spattered from the frying pan during frying was collected on a three foot by three foot square sheet of aluminum foil placed centrally under the frying pan. The amount of spattering was determined by the difference in the weight of the original foil and the foil with spattering. Table I indicates the grams of spatter and the percentage of spatter reduction obtained with the various samples versus the control.

TABLE I

| "Tween–80" weight percent concentration | Frying at 360° F. | | Frying at 420° F. | |
|---|---|---|---|---|
| | Grams of spatter | Percent spatter reduction | Grams of spatter | Percent spatter reduction |
| 0 | 3.76 | | 5.09 | |
| 0.1 | (*) | | 5.07 | 1 |
| 0.125 | 1.58 | 58 | (*) | |
| 0.2 | (*) | | 3.20 | 37 |
| 0.5 | (*) | | 1.04 | 80 |
| 1.0 | (*) | | 0.96 | 81 |
| 1.5 | (*) | | 0.55 | 89 |

*Not determined.

The cooking and salad oil compositions containing "Tween–80" remained clear under normal storage conditions. Similar compositions containing equivalent amounts of "Tween–60" (polyoxyethylene [20] sorbitan monostearate) became cloudy when stored at 40° F. and 32° F. for short periods of time. Oils are frequently subjected to these temperatures during normal storage.

Substantially similar spatter reduction and oil clarity as that obtained with "Tween–80" is obtained when polyoxyethylene (20) sorbitan palmitoleate is substituted for "Tween–80" and when refined, bleached, deodorized, and winterized cottonseed oil is substituted for the soybean oil in this example.

This example illustrates the spatter reduction achieved at concentrations of about 0.1% to about 1.0% of "Tween–80" in a clear liquid glyceride base oil. Although some additional spatter reduction is obtained at levels greater than about 1.0%, the improvement is marginal and is offset by an undesirable bitter taste as shown in the following example.

EXAMPLE 2

The flavor of various cooking and salad oil compositions having a refined, bleached, deodorized and winterized soybean base oil (I.V.=107) but containing different amounts of dispersed "Tween–80" (acid treated in the manner described in Example 1) was tested by a panel of experts. Table II, below, shows the average flavor grade for these compositions as rated by the panel.

TABLE II

| "Tween-80" weight percent concentration | Flavor grade rating on scale of 1 to 10 |
| --- | --- |
| 0 | 7.4 |
| 0.1 | 7.4 |
| 0.2 | 7.1 |
| 0.5 | 6.1 |
| 1.0 | 5.5 |
| 1.5 | 4.2 |
| 2.0 | 3.6 |

A flavor grade rating of 10 represents an absolutely bland oil which is practically unobtainable in a commercial cooking and salad oil. A rating of 5 or greater represents a suitable bland taste for a marketable cooking and salad oil the taste of which the average person cannot detect. A rating of 6 to 7 indicates a very slight taste which is barely noticeable by the panel of experts. A rating of less than 5 represents an undesirably strong taste for a commercial product. The flavor results in this example give further support to the required upper limit in concentration of about 1.0% of the polyoxyethylene sorbitan monoester in the cooking and salad oils of this invention.

EXAMPLE 3

In order to show the improvement in oxidative stability of the cooking and salad oils of this invention which is obtained by the preferred acid-treatment of the polyoxyethylene sorbitan monoester, a sample of a refined, bleached, deodorized and winterized soybean oil base oil (I.V.=107) containing 0.5% "Tween–80" dispersed therein was compared with a similar sample in which the "Tween–80" was first subjected to an acid-treament with phosphoric acid in the manner described in Example 1. The tests were made by holding the oil samples at 140° F. during a period of seven days and recording the Lovibond color readings of the samples at various intervals of time. Table III shows the Lovibond color readings of these samples.

TABLE III

| Salad oil sample | Lovibond colors*—days at 140° F. | | | |
| --- | --- | --- | --- | --- |
| | 0 | 3 | 5 | 7 |
| Control sample with 0.5% "Tween-80" Apparent pH 8.4 | 7/0.3 | 12/0.9 | 16/1.2 | 18/1.3 |
| Sample with 0.5% acid-treated "Tween-80" Apparent pH 7.0 | 7/0.3 | 9/0.6 | 12/0.9 | 15/1.1 |

*Yellow/red.

The lower Lovibond color readings of the sample containing the acid-treated "Tween–80" compared to the untreated control sample show that the sample containing the acid-treated "Tween–80" has undergone less discoloration and is therefore more stable to oxidative deterioration than the sample containing the untreated "Tween–80."

EXAMPLE 4

Salad oils are used in the preparation of salad dressings and mayonnaise. To be suitable for these uses, the salad oils must exhibit good emulsion stability. An objective test was devised to demonstrate the emulsion stability of the salad oils of this invention. Four samples were composed with refined, bleached, deodorized and winterized soybean oil (I.V.=107) and various amounts of "Tween–80" dispersed therein. A fifth sample of base oil without any "Tween–80" was used as a control and as a basis for comparison. The test consisted of measuring the time required for 10 ml. of vinegar to settle from a mixture of 25 grams of vinegar and 75 grams of the salad oil which had been vigorously shaken 50 times in a 100 ml. graduate cylinder. Table IV, below, records the results of this test.

TABLE IV

| "Tween-80" weight percent concentration | Emulsion Stability in hours required settling of 10 vinegar |
| --- | --- |
| 0 | 0.5 |
| 0.05 | 1¾ |
| 0.10 | 2¼ |
| 0.30 | 3¾ |
| 0.50 | 4¼ |

The above results show a substantial improvement in emulsion stability in the illustrative salad oil samples of this invention containing, respectively, 0.10%, 0.30%, and 0.50% "Tween–80" compared to the control salad oil which did not contain the "Tween–80."

EXAMPLE 5

The importance of using unsaturated, rather than saturated, polyoxyethylene sorbitan monoesters in the cooking and salad oils of this invention is illustrated in this example. Four compositions were prepared with a base oil of refined, bleached, deodorized and winterized soybean oil (I.V.=107). These compositions contained different amounts of either "Tween–60" (polyoxyethylene [20] sorbitan monostearate) or "Tween–80" (polyoxyethylene [20] sorbitan monooleate) dispersed therein. Samples of the four compositions were retained at both 32° F. and 40° F. and observed at various time intervals to determine the number of hours it took to clear oil to become cloudy to the naked eye. Table V, below, records the length of time for such clouding to occur in the samples.

TABLE V

| Salad oil samples | Hours required for clouding | |
| --- | --- | --- |
| | 32° F. | 40° F. |
| Control samples without additive | 24-40 | 48-64 |
| Samples with 0.25% "Tween-60" | 4 | 16 |
| Samples with 0.50% "Tween-60" | 1 | 16 |
| Samples with 0.25% "Tween-80" | 24-40 | 48-64 |
| Samples with 0.50% "Tween-80" | 24-40 | 48-64 |

These results show that salad oils containing "Tween–80" rather than "Tween–60" have a substantially better resistance to clouding at low temperatures. Substantially similar results are observed with liquid glyceride base oils other than soybean oil, for example, with winterized cottonseed oil or winterized corn oil, or with mixtures of clear oils, for example, with a mixture of soybean oil and cottonseed oil. In order to meet the minimum standards for commercial salad oils, an oil should be resistant to clouding at 32° F. for at least five hours (A.O.C.S. Method Cc–11–53).

Variations and modifications of the present invention can be made upon a study of the foregoing disclosure by those skilled in the art of cooking and salad oils. Such variations and modifications are intended to be within the spirit and scope of the invention as defined in the appended claims.

What is claimed is:

1. A cooking and salad oil composition having antispattering properties comprising a clear, liquid glyceride base oil containing as an active antispattering agent from about 0.1% to about 1.0%, by weight of the total composition, of unsaturated fatty acid monoester of polyoxyethylene sorbitan containing an average of about 20 oxyethylene units per molecule, said fatty acid having from about 14 to about 18 carbon atoms, said ester acid treated to an apparent pH between about 6.5 and 7.0 in the presence of a trace of water.

2. The composition of claim 1 in which the unsaturated fatty acid monoester of polyoxyethylene sorbitan is polyoxyethylene (20) sorbitan monoöleate.

3. The Qcomposition of claim 1 in which the unsaturated fatty acid monoester of polyoxyethylene sorbitan is about 0.125% to about 0.3% by weight of the total composition.

4. The composition of claim 1 in which the liquid glyceride base oil is selected from the group consisting of cottonseed oil, soybean oil, and mixtures thereof.

5. A cooking and salad oil composition having antispattering properties comprising a clear, liquid glyceride base oil containing as an active antispattering agent from about 0.125% to about 0.3%, by weight of the total composition, of polyoxyethylene (20) sorbitan monoöleate acid treated to an apparent pH between about 6.5 and 7.0 in the presence of a trace of water.

6. The composition of claim 5 in which the liquid glyceride base oil is selected from the group consisting of cottonseed oil, soybean oil, and mixtures thereof.

References Cited

UNITED STATES PATENTS

| | | | |
|---|---|---|---|
| 3,261,691 | 7/1966 | Erickson | 99—118 |
| 3,355,302 | 11/1967 | Purves et al. | 99—163 |

FOREIGN PATENTS

"Atlas Surface active agents," publ. by Atlas Powder Company, Wilmington, Del., 1948, Tables I and XI.

MAURICE W. GREENSTEIN, *Primary Examiner.*

U.S. Cl. X.R

99—118, 144